Oct. 6, 1970 W. STEINBERG 3,532,810
DIGITAL LOGIC CIRCUIT FOR DERIVING SYNCHRONIZING SIGNALS FROM A COMPOSITE SIGNAL
Filed Sept. 7, 1967 2 Sheets-Sheet 1

TRUTH TABLE

| INPUTS | | OUTPUT |
|---|---|---|
| 1 | 1 | 0 |
| 1 | 0 | 0 |
| 0 | 1 | 0 |
| 0 | 0 | 1 |

INVENTOR
WILLIAM STEINBERG
BY John T. O'Halloran
ATTORNEY $H = \frac{1}{15,750}$ SEC.

INVENTOR
WILLIAM STEINBERG
BY John T. O'Halloran
ATTORNEY

United States Patent Office
3,532,810
Patented Oct. 6, 1970

3,532,810
DIGITAL LOGIC CIRCUIT FOR DERIVING SYNCHRONIZING SIGNALS FROM A COMPOSITE SIGNAL

William Steinberg, Montreal, Quebec, Canada, assignor to RCA Corporation, a corporation of Delaware Filed Sept. 7, 1967, Ser. No. 666,185
Int. Cl. H04n 5/04
U.S. Cl. 178—7.3 5 Claims

ABSTRACT OF THE DISCLOSURE

A digital logic circuit extracts horizontal and vertical synchronozing (sync) pulses from a composite signal, such as a television signal to produce horizontal and vertical deflection drive signals as well as blanking pulses to synchronize remotely located apparatus with a transmitter, that transmits informational data by means of the composite signal. The sync pulses are extracted by utilizing these pulses generate first and second trains of pulses of first and second predetermined widths, respectively. The first and second pulse train signals are separately combined with the composite signal in a manner to suppress all signals but the desired sync pulses. The extracted sync pulses are then utilized to generate blanking pulses.

BACKGROUND OF THE INVENTION

Display systems that utilize a digital-to-video converter to convert binary input signals from an electronic data processor into video signals for displaying on a conventional television picture tube have been heretofore disclosed in the art. The binary input signals may, for example, comprise informational data that is displayed in alphanumeric form on the television picture tube. The use of a conventional television picture tube as the display device is extremely useful because such tubes are relatively inexpensive. Further, the binary informational data signals can be either broadcast through the air or transmitted by a direct wire connection to the picture tube. In either case, the binary informational data signals comprise a portion of the composite television signal that contains the synchronizing and blanking pulses needed to synchronize the deflection of the television picture tube with the transmitted information.

Such a hybrid digital-analog system utilizes a large number of digital processing circuits in the electronic data processor and in the digital-to-video converter. It therefore becomes economical to utilize integrated circuits as the digital processing circuits in the system. Since individual integrated circuits become relatively inexpensive when integrated circuit chips are utilized, it also becomes economical to utilize unused integrated circuits on the chips for analog signal processing after all the necessary digital logic circuits have been interconnected. Such a use avoids wasting the leftover circuits since certain television signals that are commonly processed in non-integrated analog circuits are also amenable to digital processing. One such signal is the separated television synchronizing signal.

SUMMARY OF THE INVENTION

A separated television synchronizing signal is applied to a digital logic circuit embodying the invention for extracting sync pulses therefrom to produce deflection drive signals. The digital logic circuit extracts vertical sync pulses by taking advantage of the fact that the vertical sync pulses in the separated television synchronizing signal are significantly longer in duration than the other pulses in this signal. The digital logic circuit generates a first train of pulses having a width less than the width of the vertical sync pulses but greater than the width of the other pulses in the separated television synchronizing signal and combines the first train of pulses with the separated television synchronizing signal in a manner to cancel, with the exception of the vertical sync pulses, all the pulses in the separated television synchronizing signal.

The horizontal sync pulses are extracted by generating a second train of pulses of a width greater than one-half the period of the horizontal sync pluses so that the second train of pulse signals suppress alternate equalizing and vertical sync pulses by bridging over these double frequency pulses.

DETAILED DESCRIPTION

Figures 1, 3:
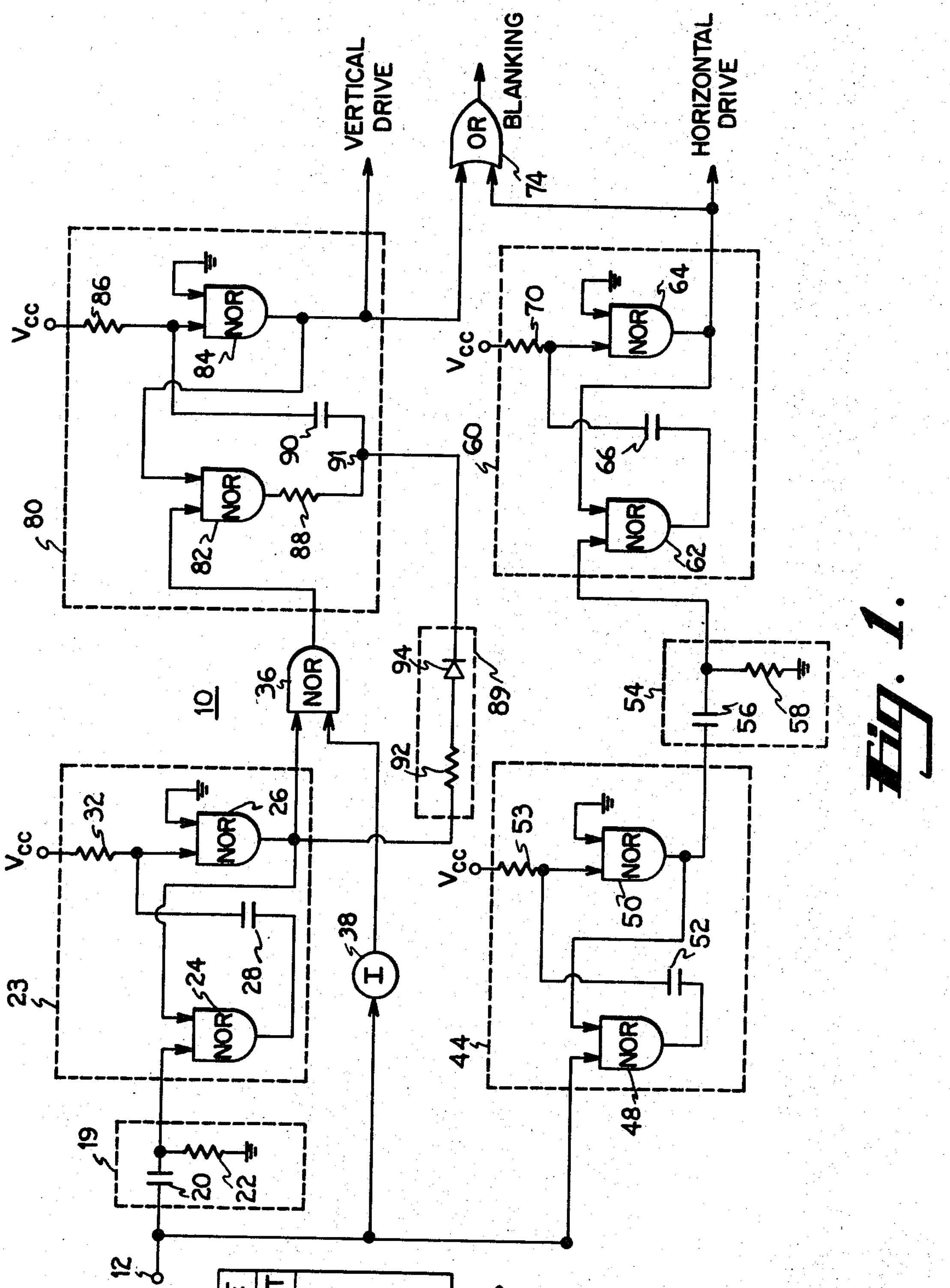
FIG. 1 is a schematic block diagram of a digital logic circuit embodying the invention.
FIG. 3 is a Truth Table corresponding to the operation of a logical NOR gate.

Referring now to FIG. 1, there is shown a digital logic circuit 10 that generates vertical and horizontal deflection drive signals as well as blanking pulses in order to control the deflection of a scanning beam in a television picture tube, or other electron beam tubes operated with a television-like scanning raster, such as a storage tube. The digital logic circuit 10 includes an input terminal 12 to which is applied a separated television synchronizing signal 14 similar to that shown in line *a* of FIG. 2. The separated television synchronizing signal 14 may, for example, be derived from a composite television signal from which has been stripped the synchronizing and equalizing pulses that originally appeared in the "blacker than black" region of the composite television signal. The separated television synchronizing signal 14 represents a portion of an odd field in an interlaced television scan system. Such a separated television synchronizing signal 14 includes horizontal sync pulses 15 during each of which the scanning beam in the picture tube is retraced to the left side of the tube to begin a new scanline and vertical sync pulses 16 during which the scanning beam is retraced to the top of the tube. The vertical sync pulses 16 are bracketed by two groups of equalizing sync pulses 17 and 18. Each horizontal pulse occurs every 1/15,750 seconds and this pulse repetition rate or period is denoted H in FIG. 2. A horizontal sync pulse may typically be 4.5 microseconds in duration. The equalizing sync pulses 17 and 18 and the vertical sync pulses 16 exhibit a pulse repetition rate equal to $H/2$ and consequently two of each of these pulses occur during each horizontal sync pulse period.

The separated television synchronizing signal 14 may be stripped from a composite television signal by a threshold circuit that is biased to conduct at the black level and to conduct only during the portion of the composite television signals that is "blacker than black." The separated television synchronizing signal 14 is applied through a differentiator or pulse forming circuit 19 that includes a capacitor 20 and a resistor 22 coupled between the input terminal 12 and a point of reference potential or circuit ground. The junction of the capacitor 20 and resistor 22 is coupled to a first trigger circuit or one-shot multivibrator 23. The first multivibrator 23 includes a pair of NOR gates 24 and 26 with the output of the NOR gate 26 being coupled back to the first input terminal of the NOR gate 24 and the output of the NOR gate 24 being coupled through a capacitor 28 to the first input terminal of the NOR gate 26. The first input terminal of the NOR gate 26 is also coupled through a resistor 32 to a source of biasing potential Vcc. The second input terminal of the NOR gate 26 is grounded, whereas the second input terminal of the NOR gate 24 comprises the input for the multivibrator 23 and is coupled to receive the differentiated input signal from the differentiator 19. The NOR gates 24 and 26 function as a monostable multivibrator. In the stable state, the NOR gate 24 exhibits a binary "1" or high level output and the NOR gate 26 exhibits a binary "0" or low level output for positive logic operation. In the astable state, the NOR gate 26 exhibits a binary "0" or low level output for NOR gate 24 produces a binary "0" level pulse. The duration of the pulse output is selected to be greater than the duration of the horizontal sync pulses 15 and the equalizing pulses 17 and 18 but less than the pulse duration of the vertical sync pulses 16. The NOR gates 24 and 26, for example, may comprise standard circuits such as the integrated circuit, RCA CD 2201 which is described in the publication "RCA Integrated Circuit Product Guide CDL–820," published by RCA Electronic Components and Devices, Harrison, N.J.

A typical pulse duration for the output pulses from the multivibrator 23 may, for example, be 10 microseconds. The value of the capacitor 28 and the resistor 32 are therefore selected to exhibit a charge rate or time constant that causes the NOR gate 26 to produce an output pulse of substantially ten microseconds duration. The multivibrator 23 produces an output pulse for every pulse in the separated television synchronizing signal 14. The pulses from the first multivibrator 23 comprise a first pulse train 34 that is shown in line *b* of FIG. 2. The first pulse train 34 derived from the multivibrator 23 is applied to one input terminal of a coincidence gate 36. The coincidence gate 36 may, for example, comprise a NOR gate similar to the NOR gates 24 and 26 in the multivibrator 23 and exhibits a Truth Table as shown in FIG. 3. For negative logic, the coincidence gate 36, and all the other NOR gates in the logic circuit 10, would comprise NAND gates.

Figure 2:
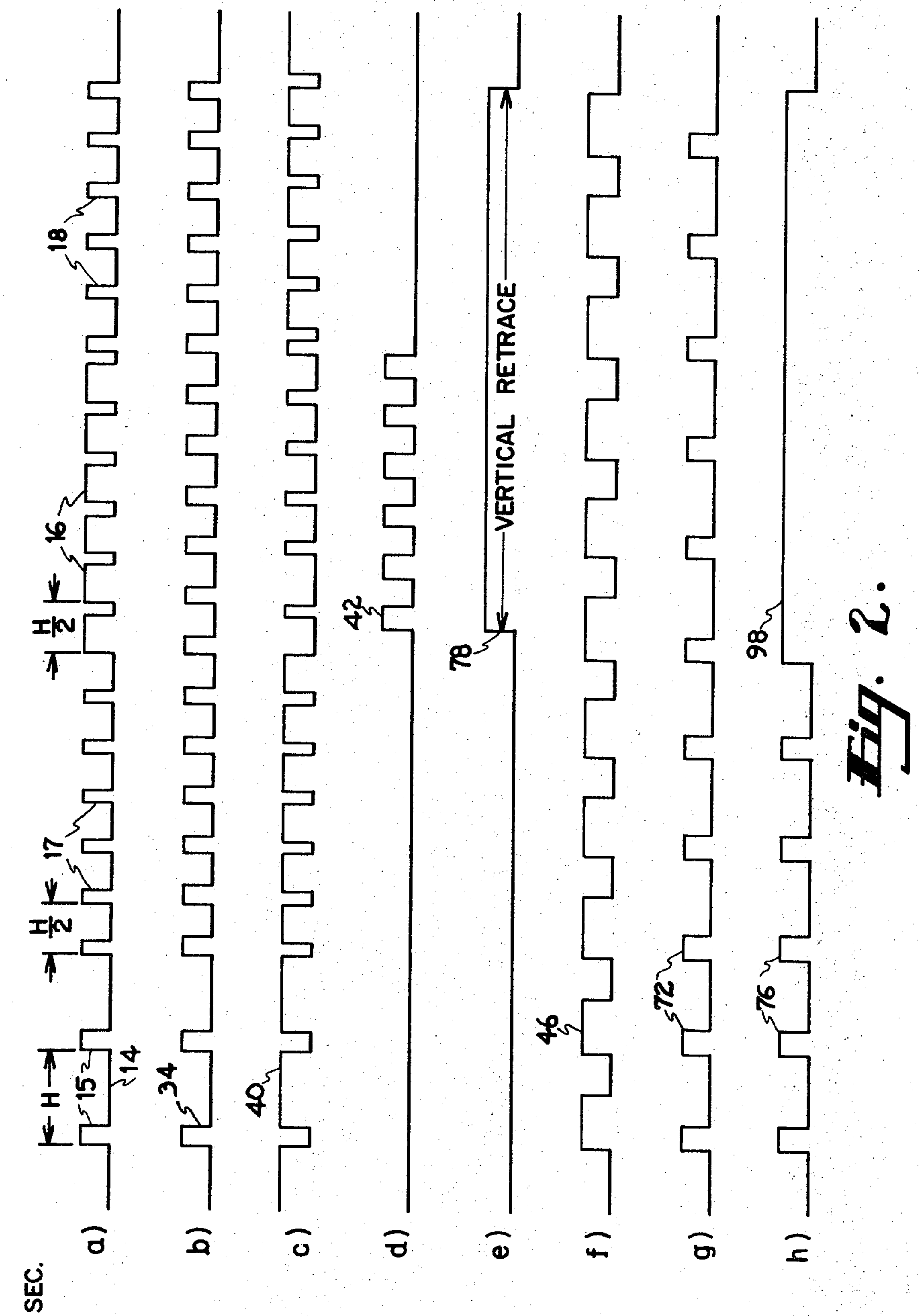
FIG. 2 is a graph illustrating the waveforms that appear in various places of FIG. 1.

The separated television synchronizing signal 14 is also applied from the input terminal 12 of the logic circuit 10 to an inverter 38 to produce a complemented separated television synchronizing signal 40 as shown in line *c* of FIG. 2. The complemented synchronizing signal 40 is applied from the inverter 38 to the other input terminal of the coincidence gate 36. The coincidence gate 36 extracts only the vertical sync pulses from the separated television synchonizing signal 14, as shown by the pulses 42 in line *d* of FIG. 2.

The horizontal sync pulses are derived from the separated television synchronizing signal 14 by applying the signal 14 to a second trigger circuit or monostable multivibrator 44 to generate a second train of pulses, as shown by the pulse train 46 in line *f* of FIG. 2. The monostable multivibrator 44 includes a pair of NOR gates 48 and 50 intercoupled similarly to the NOR gates 24 and 26 in the multivibrator 23. The capacitor 52 and biasing resistor 53 are selected to cause the multivibrator 44 to produce output pulses of 40 microseconds in duration. The 40 microsecond duration of the pulses in the second pulse train 46 is selected to cause these pulses to bridge over every other one of the equalizing pulses 17 and 18 and vertical sync pulses 16 in the separated synchronizing televison signal 14 so as to effectively suppress these pulses. Thus, one pulse appears in the second pulse train 46 for each horizontal sync pulse period H in the separated television synchronizing signal 14. However, the pulses in the second pulse train 46 are too long to comprise horizontal retrace drive signals. Accordingly, the pulse train 46 is coupled through a pulse shaping circuit or differentiator 54 to a pulse shaping multivibrator 60. The differentiator 54 includes a capacitor 56 and a resistor 58 coupled between the output of the multivibrator 44 and circuit ground.

The junction of the capacitor 56 and resistor 58 is coupled to apply the differentiated pulses from the second pulse train 46 to the pulse shaping monostable multivibrator 60. The multivibrator 60 includes NOR gates 62 and 64 and capacitor 6 intercoupled identically to the multivibrator 23 and biased in the same manner through the biasing resistor 70. The capacitor 66 and the resistor 70 are selected to cause the multivibrator 60 to produce output pulses having a duration of substantially 9.2 microseconds, such as shown by the pulses 72 in line *g* of FIG. 2. The pulses 72 comprise the horizontal deflection drive pulses produced by the logic circuit 10. The pulses 72 are of the correct duration to cause horizontal retrace of an electron beam. The horizontal pulses 72 are applied to an OR gate 74 to generate blanking pulses during the horizontal retrace of the scanning beam. Such blanking pulses are shown by the pulses 76 in line *h* of FIG. 2.

The extracted vertical sync pulses 42 of FIG. 2 are utilized to generate a vertical deflection retrace drive signal such as shown by the pulse 78 in line *e* of FIG. 2. Consequently the extracted vertical sync pulses 42 are applied to a fourth monostable multivibrator 80 which includes NOR gates 82 and 84. The multivibrator 80 is biased through resistor 86 but includes a resistor 88 as well as a capacitor 90 in the cross-coupling path from the output of the NOR gate 82 to the input of the NOR gate 84. A unidirectional conducting circuit 89, including the series combination of a resistor 92 and diode 94, is coupled between the output of the multivibrator 23 and the junction 91 of the resistor 88 and capacitor 90 to insure that the vertical drive signal 78 derived from the multivibrator 80 is synchronized with the separated television synchronizing signal 14. Consequently, the charge rate of the capacitor 90 is selected so that the sixth equalizing pulse in the pulse group 18 causes the capacitor 90 to turn off the NOR gate 84 to terminate the drive pulse 78. Thus, the end of the drive pulse 78 represents the beginning of a new scanning field.

The vertical drive pulse 78 derived from the multivibrator 80 is also coupled through the OR gate 74 to provide a blanking pulse 98 as shown in line *h* of FIG. 2. The pulse 98 maintains the scanning beam off when the beam is vertically retraced to the top of the picture tube.

OPERATION

The digital logic circuit 10 extracts vertical and horizontal sync pulses from the separated television synchronizing signal 14 and generates vertical 78 and horizontal drive 72 pulses as well as blanking pulses 76 and 98 to control the deflection of an electron beam in a standard television raster scanning system. The individual pulses in the separated television synchronizing signal 14 are utilized to trigger the first monostable multivibrator 23 to produce a first train of pulses 34 with each pulse in the train 34 corresponding to a pulse in the signal 14. The pulses in the train 34 exhibit a first predetermined duration that is selected to be greater than the pulse duration of either of the equalizing pulses or the horizontal sync pulses in the signal 14 but less than the duration of the vertical sync pulses 16 therein. The pulse train 34 is then utilized to cancel all of the pulses in the separated television synchronizing signal 14 with the exception of the vertical sync pulses. This is accomplished by inverting (i.e., complementing) the separated synchronizing television signal 14 in an inverter 38 and applying the complemented signal 40 along with the first pulse train 34 to the coincidence gate 36. Since the coincidence gate 36 is a NOR gate, this gate produces a binary "1" or high level output signal only when both the input signals are binary "0" or low level signals. The only time this occurs is during the latter portion of the vertical sync pulses 16. Consequently, six synchronizing pulses 42 are extracted from the signal 14 by the coincidence gate 36. It is to be noted that the six synchronizing pulses 42 are 10 microseconds less in duration than the vertical sync pulses 16 in the signal 14 but this has no adverse effect on the scanning system or the reliability of the logic drive circuit 10.

The separated vertical sync pulses 42 are applied to the monostable multivibrator 80 and the leading edge of the first of the six sync pulses 42 triggers the multivibrator 80 to produce a vertical retrace drive pulse 78 of 380 microseconds duration. The vertical retrace drive pulse 78 exhibits a pulse width substantially equal to the time it takes the scanning beam in the picture tube to retrace from the bottom of a field to the top of the next field. To insure that the pulse 78 is of the proper duration, the first pulse train 34 is also coupled through the unidirectional coupling circuit 89 to control the time the multivibrator 80 is activated. The sixth (last) equalizing pulse in the second group 18 of the equalizing pulses causes the capacitor 90 to be recharged sufficiently to turn off the multivibrator 80. This pulse coincides with the beginning of the first scanline of the next field. Consequently, the vertical retrace pulse 78 is synchronized properly with the signal 14.

The television signal 14 is also applied to the second trigger circuit or monostable multivibrator 44 to generate a second train of pulses 46. Each of the pulses 46 in the second train of pulses exhibits a duration of 40 microseconds so as to cause the second trigger circuit 60 to bridge over or suppress every other equalizing and vertical synchronizing pulse in the television signal 14 but not suppress those pulses at a repetition rate of H. The second pulse train 72 is then reshaped in the multivibrator 60 to be of the proper duration to retrace the scanning beam at the end of each scanning line.

Both the vertical drive pulse 78 and the horizontal drive pulse 72 in each field are coupled through an OR gate 74 to provide blanking pulses for a standard television system. The blanking pulses 76 and 98 are utilized to blank out the scanning beam during horizontal and vertical retrace, respectively.

Thus, a digital logic drive circuit that generates vertical and horizontal retrace drive pulse and utilizes these pulses to generate blanking pulses has been described. The monostable multivibrator utilized in the digital logic circuit may be integrated and consequently manufactured relatively inexpensively. The digital logic drive circuit may be utilized to provide the signals to effect a scanning raster operation for tubes such as storage tubes or monitor tubes not containing raster deflection circuitry. It is to be also noted that unlike circuits in standard television receivers, the digital logic circuit 10 does not need manual adjustments, such as adjusting potentiometers, to cause the circuit to operate as desired. Once the digital logic circuit 10 has been initially adjusted, it may be turned on and off repeatedly with no further adjustments needed.

What is claimed is:

1. A digital logic circuit for extracting synchronizing pulses from a synchronizing signal including vertical and horizontal synchronizing pulses and equalizing pulses, compirsing, the combination of, a trigger circuit, means for applying said synchronizing signal to said trigger circuit to cause said trigger circuit to generate a first train of pulse signals with the pulses in said train of pulse signals corresponding to said synchronizing and equalizing pulses, a coincidence gate, means for applying said train of pulse signals and said synchronizing signal to said coincidence gate in a manner to activate said coincidence gate only during the occurrence of said vertical synchronizing pulses so as to extract only said vertical synchronizing pulses from said synchronizing signal, a monostable mutlivibrator including a pair of cross-coupled gates, and means for applying the extracted vertical synchronizing pulses extracted from said synchronizing signal to said multivibrator so that on the first of said extracted synchronizing pulses the leading edge of a vertical retrace drive pulse is generated by said multivibrator.

2. The combination in accordance with claim 1 that further includes, means for applying said synchronizing signal to said monostable multivibrator so that said equalizing pulses determine the trailing edge of said vertical retrace drive pulse.

3. The combination in accordance with claim 2 that further includes, a second trigger circuit, and means for applying said synchronizing signal to said second trigger circuit to generate a second train of pulse signals, each pulse in said second train of pulse signals being generated on the occurrence of every one of said horizontal synchronizing pulses and every alternate one of said equalizing and vertical synchronizing pulses.

4. The combination in accordance with claim 3 that further includes, a monostable multivibrator coupled to said second trigger circuit to generate a horizontal retrace pulse for each pulse in said second train of pulse signals.

5. The combination in accordance with claim 4 that further includes, means for combining said horizontal and vertical retrace pulses to generate blanking pulses for a raster scan pattern.

References Cited

UNITED STATES PATENTS 3,435,141 3/1969 Hileman et al. ______ 178—69.5

ROBERT L. GRIFFIN, Primary Examiner

A. H. HANDAL, Assistant Examiner

U.S. Cl. X.R.

178—69.5